2,994,080
RADAR CLUTTER SUPPRESSION
Arthur A. Varela, Alexandria, Va., assignor to the United States of America as represented by the Secretary of the Navy
Filed Dec. 28, 1955, Ser. No. 556,023
3 Claims. (Cl. 343—17.1)
(Granted under Title 35, U.S. Code (1952), sec. 266)

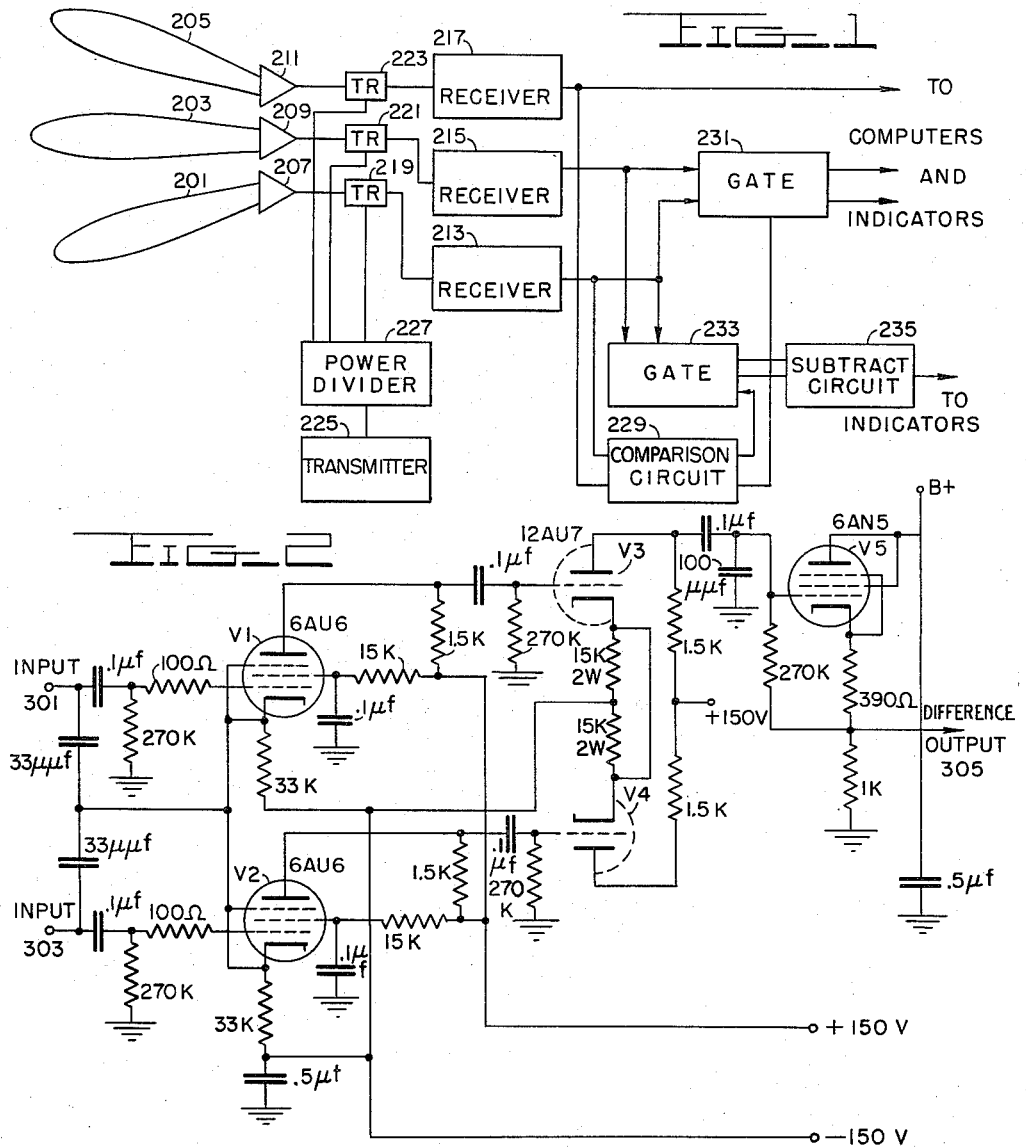

The invention described herein may be manufactured and used by or for the Government of the United States of America for governmental purposes without the payment of any royalties thereon or therefor.

This invention relates to apparatus for suppressing clutter appearing on indicator scopes of radar systems and more particularly to apparatus for suppressing sea clutter. Clutter may be described as echoes that result from scatter on the surface of ground or water or any turbulent condition on such surface. Clutter differs from noise voltages in that noise voltages are random in nature whereas clutter echo is partially repeated from scan to scan on the radar scope. Sea clutter is caused by scattering of reflected energy from turbulene on the sea surface.

Various methods and apparatus for suppressing clutter are known. One of the most widely known methods is that of the STC or sensitivity time control. With STC, the sensitivity of the receiver is reduced during the initial part of the receiving time below the level at which the clutter echoes are being returned. Beyond the clutter range the sensitivity is again returned to normal. During the time interval in which the signals are being received from the clutter range only the target echoes producing stronger return signals than that of the clutter are presented on the radar scope. The disadvantage of the sensitivity time control method however is that signals of equal or lesser magnitude than the clutter echo are also below the operating range of the less sensitive receiver and thus they are lost as well as the clutter.

Another well known method for eliminating disturbances such as clutter is that of the moving target indicator or the MTI radar. In this system, successive scans of the received energy are compared. Clutter presented on one scan is not necessarily presented in the same magnitude in a succeeding scan. Therefore the MTI system would not operate effectively to eliminate clutter in a radar system.

With the present invention apparatus is disclosed for improved clutter suppression. Clutter suppression is accomplished by means of comparison of two lower beams in a multiple beam height finding radar system. Clutter echoes from the same scan are compared. By adding a lower beam and directing the beam at a greater downward angle than the beam immediately above, cancellation of clutter was found possible.

An object of this invention is to provide an apparatus for the suppression of clutter echo in a radar system.

Another object of this invention is to provide a method for the suppression of clutter echo in an aircraft radar system.

A further object of this invention is to provide a means for eliminating sea clutter in a radar system.

A further object of this invention is to provide a beam comparison method of clutter suppression in a radar system.

Another object of this invention is to provide apparatus that will eliminate unwanted return echoes from a radar scope.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 illustrates in block diagram a system of clutter suppression.

FIG. 2 illustrates a typical subtract circuit that may be used in conjunction with a typical clutter suppression system.

In accordance with the objects of this invention clutter suppression circuits may be adapted to any multiple beam radar system in which separate receivers are used for each beam. The clutter suppression is accomplished by subtracting the outputs of the two lower beams in an array. Since clutter occurs predominately in the lower beams, the detection of the presence of clutter is first accomplished by comparing the output of the upper beam or upper beams with the lower or lowest beam. Upon such detection of clutter, gate circuits operate to effect a subtraction of clutter in the output of the two lower beams of the system. When there is no clutter present the output from all of the receivers are added together and applied to the computers and indicators. However, upon an indication of clutter as shown by a comparison of an upper or a group of upper beams with the lowest beam, the outputs of the lower two beams are fed to a subtract circuit and the difference output from the two beams is supplied together with the outputs from the upper beams to indicators such as PPI scopes.

Referring now to FIG. 1 of the drawings in which a block diagram of a radar system employing clutter suppression is illustrated, an antenna array for purposes of illustration consists of beams of 201, 203 and 205. In practice any number of beams may be employed in the antenna array. The two lower beams namely 201 and 203 form a part of the clutter suppression system. In a preferred embodiment, the lower beam projects at a small downward angle and the next lower beam projects in a horizontal direction while the upper beams project at increasing positive angles of elevation. In practice however, the lower beam might project at a horizontal angle or even at a positive angle of elevation and the beams immediately above at greater positive elevation angles. Antenna horn 207 projects lower beam 201, antenna horn 209 projects middle beam 203, and antenna horn 211 projects the upper beam 205.

Receivers 213, 215, and 217 connect through TR boxes 219, 221 and 223, respectively to antennas 207, 209, 211, to receive and amplify the return signals of beams 201, 203 and 205. Transmitter 225 connects through power divider 227 and through TR boxes 219, 221 and 223 to antenna horns 207, 209 and 211, respectively. The power divider 227 is preferably a 3 db divider but any power divider which distributes the transmitted power in a suitable ratio among the antenna beams may be used. Transmitter 225 furnishes pulsed power to the antenna system. The transmitter pulses are synchronized with indicating circuits as in any conventional radar system. The outputs from receivers 213, 215 and 217, feed directly into the computer and indicator circuits when no clutter is present. When there is no clutter present, gate 231 is open and gate 233 is closed. When clutter is present, the outputs of receivers 213 and 217 fed into the comparison circuit 229. Should there be more than three beams in the particular radar system in which the clutter suppression is adapted, the output from several upper beams and the lowest beam is fed into the comparison circuit. The output from receiver 217 is compared with the the output of receiver 213 to determine the presence of clutter. When clutter is present, gate 233 is open and the output of the two lower receivers 213 and 215 is applied to subtract circuit 235. The difference output of receivers 213 and 215 is then applied to the indicator circuits. Comparison circuit 229 may be any circuit which will operate upon detection of a difference in amplitude between receiver outputs. The subtract circuit may be any circuit that will function such as the circuit disclosed in the co-pending application Serial No. 250,774, filed October 10, 1951, by Torrence H. Chambers for "Differencing Circuits," now abandoned. An exemplary subtract circuit is shown schematically in FIG. 2. Gates 231 and 233 operate by signals received from comparison circuit 229. The gates operate in alternation, that is, when gate 231 is open, gate 233 is closed, and vice versa.

In operation, pulse energy from transmitter 225 conducts through power divider 227 and TR boxes 219, 221 and 223 to the antennas 207, 209, 211 respectively and is radiated in the beams 201, 203 and 205. The power division or distribution of energy among the beams is determined by power divider 227. Each of the antennas 207, 209 and 211 radiates a beam at different elevation angles. After the radiation energy has reached a particular object or target it is reflected back and picked up by antenas 207, 209, 211 and then passed on to the receivers 213, 215 and 217. Among the reflected energy received is target echoes, clutter, and noise voltages. Target echoes and noise voltages do not ordinarily operate to change the function of the system.

When clutter is not present among the received energy the amplified output from receivers 213, 215 and 217 are fed directly to computer circuits and through non-linear mixers to the indicator circuits. The radar system will then function as a conventional system without clutter suppression circuits.

Should clutter be present in the beam radiation area, a difference in amplitude between the upper beams and lowest beam will be detected in comparison circuit 229. Since clutter is a sea or ground surface phenomena, the greatest amount of the clutter will be picked up by the lower beams of the radiation pattern. The lowest beam containing clutter will have a greater amplitude level than that of the upper beam or beams. Comparison of beam 201 with beam 205 as amplified by receivers 213 and 215 will show such difference in amplitude. This difference is detected by comparison circuit 229. Comparison circuit 229, upon detecting clutter operates to close gate 231 and open gate 233 simultaneously. Outputs of receivers 213 and 215 feed into the subtract circuit 235 and then to indicator units. The operation of subtract circuit 235 can best be understood when considered with reference to FIG. 2 of the drawings in which subtract circuit 235 is shown in detail.

In the subtract circuit shown in FIG. 2, inputs 301 and 303 serve to connect the outputs of receivers 213 and 215. The subtract circuit illustrated consists of two stages of push-pull amplification. In each stage, high value unbypassed resistors are used in the cathode circuits. Such high value resistors provide for degeneration of the signals applied to the tube circuits. For example if a signal is applied to the grid of tube $V_1$, the cathode voltage will tend to follow the signal applied to the grid and thus the amplification of the applied signal is reduced. A high negative voltage is applied to the cathodes of the push-pull stages. Such bias makes possible reasonable currents in the tube circuits. Common cathode connections for each of the push-pull stages provides a degenerative effect on in-phase components of input signals applied to the grids of the tubes $V_1$ and $V_2$ of the first push-pull stage and $V_3$ and $V_4$ of the second push-pull stage. Signals applied to input 301 feed into the grid of $V_1$ and signals applied to input 303 feed into the grid of $V_2$. After the initial amplification in tubes $V_1$ and $V_2$, the signals are applied to the grids of $V_3$ and $V_4$. In each stage, the in-phase signal components of the two applied signals are suppressed and the out of phase or push-pull signals are amplified. The difference signal is taken from the plate of tube $V_3$ and applied to cathode follower $V_5$. The difference output is taken from the cathode circuit of cathode follower $V_5$.

Logarithmic receivers were used in an embodiment of this invention, although other types of receivers may be used without departing from the spirit of this invention. Inasmuch as the sea clutter is strongest on the lower beam the sensitivity of the receivers connected to the two lower beams or the power radiated on these beams may be adjusted such that the clutter cancellation will be complete.

Logarithmic receivers produce an output signal amplified in proportion to the logarithm of the input signal. In other words, a signal of small amplitude is expanded in comparison to the amplification of the same signal in a linear receiver and a signal of large amplitude is compressed in comparison to the amplification of such a signal in a linear receiver. When subtracting signal outputs from logarithmic receivers, the following mathematical law may be applied:

$$\log a - \log b = \log \frac{a}{b}$$

If $a$ is representative of the clutter signal strength of the lowest beam as amplified by one logarithmic receiver and $b$ is representative of the clutter signal strength of the second lowest beam as amplified by a second logarithmic receiver, the difference signal resulting from the subtraction of the two signals may be presented as the log of ratio $a/b$. Since this ratio represents the difference between the clutter signal received by the two lowest beams from a single point of clutter, it is the ratio of the gain of the two lowest beams. Because of the directivity and displacement in elevation of the beams, the ratio of gain will vary continuously from the shortest to the longest clutter range. This continuous variation may be used to provide a difference signal having a D.C. voltage level whose amplitude will vary with range as the relative gains vary with range. This variation is slow in comparison to the target pulse durations and hence the target pulse may be superposed upon this slowly varying D.C. voltage. Clutter echoes are thus suppressed, while target echoes are passed on to indicator circuits.

In a typical operation, when the presence of clutter is indicated by a comparison of the output of receivers 213 and 217, gate 233 is opened and the output signals of receivers 213 and 215, each having a magnitude dependent on the logarithm of the level of clutter received, are applied to subtract circuit 235. The in-phase components of the signals applied to the subtract circuit are suppressed and the out of phase components are amplified. Thus, the difference in magnitude between the signals is amplified. Since beams 201 and 203 have a directivity and are displaced in elevation so that the ratio of gain of the beams varies continuously with range, the output of subtract circuit 235 is a D.C. voltage varying slowly with range. When an echo is received from a target, the directivity of beams 201 and 203 are such that the difference in magnitude between the logarithm of the signals applied to subtract circuit 235 will cause a pulse to be superimposed on the D.C. voltage in the output of the subtract circuit. The D.C. voltage may be suppressed while the pulse is passed to the indicators.

If linear receivers are used, automatic gain control or other sensitivity control must be applied to both of the receivers from which clutter signal is to be compared in such a manner that the total clutter signal from both receivers is time invariant. Since the ratio of two clutter signals in the beams is constant, the above condition will lead to a constant D.C. voltage from the subtraction process. In the case, however, of an elevated target, the different ratio of the gain of the two beams will lead to a different resultant from the subtraction process and thus to signal detection. The time constant response of the automatic gain control must be sufficiently long so that cancellation of target pulses is not effected. The time constant should be sufficiently short to follow the clutter amplitude variation with a change in the clutter range.

In an embodiment of the present invention, five beams were used. The lower beam elevation was −3.5°; the second beam 0°; the third beam +3.5°; the fourth beam +7°; and the fifth beam +10.5°.

Obviously many modifications and variations of the present invention are possible in the light of the above teachings. It is therefore to be understood that within the scope of the appended claims the invention may be practiced otherwise than as specifically described.

What is claimed is:

1. In a pulse echo system, a first directional antenna and a second directional antenna having response patterns displaced in elevation angle, first means connected to said first directional antenna for providing a first signal having a magnitude dependent on the logarithm of the magnitude of energy received by said first directional antenna, second means connected to said second directional antenna for providing a second signal having a magnitude dependent on the logarithm of energy received by said second directional antenna, the energy received by said first directional antenna and said second directional antenna being received from the same point, means connected to said first means and said second means for suppressing the in-phase components and amplifying the out-of-phase components of said first signal and second signal, an output circuit, and means for connecting said output circuit to said last mentioned means.

2. In an electrical circuit, a first, second and third energy source, first means connected to said first energy source for providing a first signal having a magnitude dependent upon the logarithm of the magnitude of energy provided by said first energy source, second means connected to said second energy source for providing a second signal having a magnitude dependent upon the logarithm of the magnitude of energy provided by said second energy source, third means connected to said third energy source for providing a third signal having a magnitude dependent upon the logarithm of the magnitude of energy provided by said third energy source, comparing means connected to said first means and said third means for providing a control signal having a magnitude dependent upon the difference in magnitude between said first and third signals, subtracting means for suppressing the in-phase components and amplifying the out-of-phase components of said first and second signals, means connected to said comparing means and responsive to the magnitude of said control signal for applying said first and second signals to said subtracting means, an output circuit, and means connecting said output circuit to said subtracting means.

3. In a pulse echo system, a first, second and third directional antenna having response patterns successively displaced in elevation angle, first means connected to said first directional antenna for providing a first signal having a magnitude dependent upon the logarithm of the magnitude of energy received by said first directional antenna, second means connected to said second directional antenna for providing a second signal having a magnitude dependent upon the logarithm of energy received by said second directional antenna, third means connected to said third directional antenna for providing a third signal having a magnitude dependent upon the logarithm of energy received by said third directional antenna, the energy received by said first, second and third antennae being received from the same point, comparing means connected to said first means and said third means for providing a control signal having a magnitude dependent upon the difference in magnitude between said first and third signals, subtracting means for suppressing the in-phase components and amplifying the out-of-phase components of said first and second signals, means connected to said comparing means and responsive to the magnitude of said control signal for applying said first and second signals to said subtracting means, an output circuit, and means connecting said output circuit to said subtracting means.

References Cited in the file of this patent

UNITED STATES PATENTS

| | | |
|---|---|---|
| 2,166,991 | Guanella | July 25, 1939 |
| 2,456,666 | Agate | Dec. 21, 1948 |
| 2,508,571 | Hudspeth | May 23, 1950 |
| 2,509,207 | Busignies | May 30, 1950 |
| 2,532,566 | Millman | Dec. 5, 1950 |
| 2,608,683 | Blewett | Aug. 26, 1952 |
| 2,677,729 | Mayne | May 4, 1954 |
| 2,682,048 | Longacre | June 22, 1954 |
| 2,774,825 | Sherr | Dec. 18, 1956 |
| 2,784,400 | Ehrenfried | Mar. 5, 1957 |

FOREIGN PATENTS

| | | |
|---|---|---|
| 720,345 | Great Britain | Dec. 15, 1954 |